US012436494B2

(12) United States Patent
Sato et al.

(10) Patent No.: US 12,436,494 B2
(45) Date of Patent: Oct. 7, 2025

(54) IMAGE FORMING DEVICE AND PROCESS CARTRIDGE THEREFOR

(71) Applicant: BROTHER KOGYO KABUSHIKI KAISHA, Nagoya (JP)

(72) Inventors: Shougo Sato, Seto (JP); Kazuna Taguchi, Nagoya (JP); Shunsuke Ishii, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/765,403

(22) Filed: Jul. 8, 2024

(65) Prior Publication Data

US 2024/0361726 A1 Oct. 31, 2024

Related U.S. Application Data

(63) Continuation of application No. 18/306,299, filed on Apr. 25, 2023, now Pat. No. 12,061,437, which is a
(Continued)

(30) Foreign Application Priority Data

Jul. 1, 2021 (JP) ................................ 2021-109987

(51) Int. Cl.
*G03G 21/16* (2006.01)
*G03G 15/08* (2006.01)
(Continued)

(52) U.S. Cl.
CPC ..... *G03G 21/1814* (2013.01); *G03G 15/0877* (2013.01); *G03G 21/12* (2013.01); *G03G 21/1676* (2013.01); *G03G 2215/0869* (2013.01)

(58) Field of Classification Search
CPC ............... G03G 15/0877; G03G 21/12; G03G 21/1676; G03G 21/1814
(Continued)

(56) References Cited

U.S. PATENT DOCUMENTS

| | | | | |
|---|---|---|---|---|
| 1,366,422 A | | 1/1921 | Seymour | |
| 11,372,348 B2 | * | 6/2022 | Maeda .............. | G03G 15/0889 |

(Continued)

FOREIGN PATENT DOCUMENTS

| | | | |
|---|---|---|---|
| JP | 2016130805 | * | 7/2016 |
| JP | 2017182012 A | | 10/2017 |
| WO | 2020/180343 A1 | | 9/2020 |

OTHER PUBLICATIONS

Notice of Allowance dated Feb. 2, 2023 from parent U.S. Appl. No. 17/831,849.

(Continued)

*Primary Examiner* — Hoan H Tran
(74) *Attorney, Agent, or Firm* — Scully, Scott, Murphy & Presser, PC

(57) ABSTRACT

An image forming device is provided with a housing formed with an opening, a cover configured to move between a closing position and an opening position, and a plurality of process cartridges including a first process cartridge and a second process cartridge. The first and second process cartridges respectively include first and second photosensitive drums configured to rotate about first and second drum axes both extending in a first direction. The first and second developing devices are configured to supply toner to the first and second photosensitive drums, respectively. The first and second supplying devices are formed with first and second supply ports through which the toner to be supplied to the
(Continued)

first and second developing devices are provided, respectively. Both the first and second supplying ports are opened to outside the housing.

10 Claims, 10 Drawing Sheets

Related U.S. Application Data continuation of application No. 17/831,849, filed on Jun. 3, 2022, now Pat. No. 11,669,042.

(51) Int. Cl.
*G03G 21/12* (2006.01)
*G03G 21/18* (2006.01)

(58) Field of Classification Search
USPC .......................................... 399/107, 110, 111
See application file for complete search history.

(56) References Cited

U.S. PATENT DOCUMENTS

| | | | |
|---|---|---|---|
| 2020/0233375 | A1 | 7/2020 | Sato |
| 2023/0026290 | A1 | 1/2023 | Ogawa et al. |

OTHER PUBLICATIONS

Notice of Allowance dated Apr. 18, 2024 from parent U.S. Appl. No. 18/306,299.

* cited by examiner

IMAGE FORMING DEVICE AND PROCESS CARTRIDGE THEREFOR

REFERENCE TO RELATED APPLICATIONS

This application is a continuation application of U.S. Ser. No. 18/306,299 filed on Apr. 25, 2023, which is a continuation of U.S. Ser. No. 17/831,849 filed on Jun. 3, 2022, now U.S. Pat. No. 11,669,042 granted on Jun. 6, 2023 and claims priority from Japanese Patent Application No. 2021-109987 filed on Jul. 1, 2021. The entire contents of each of which is incorporated herein by reference.

BACKGROUND ART

The present disclosures relate to an image forming device and a process cartridge therefor.

Conventionally, there is known an image processing device equipped with a photosensitive drum, a developing device and a supplying device. The supplying device is configured to supply toner to the developing device. The supplying device is formed with a supply port. The supply port is configured to receive toner. A toner supplying cartridge is connected to the supply port. The toner is supplied from the toner supplying cartridge to the developing device via the supplying device.

DESCRIPTION

The conventional image forming device as described above is, for example, a printer dedicated to monochromatic printing. Even in a printer that is configured to print in multiple colors, there is a desire that tone is supplied externally in order to reduce the running costs of such color printers.

According to aspects of the present disclosures, there is provided an image forming device which is provided with a housing formed with an opening, a cover configured to move between a closing position at which the cover closes the opening and an opening position at which the cover exposes the opening, and a plurality of process cartridges including a first process cartridge and a second process cartridge. The first process cartridge includes a first photosensitive drum configured to rotate about a first drum axis extending in a first direction, a first developing device configured to supply toner to the first photosensitive drum, and a first supplying device configured to supply the toner to the first developing device. The first supplying device is formed with a first supply port through which the toner to be supplied to the first developing device is provided, and the first supplying port is opened to outside the housing. The second process cartridge includes a second photosensitive drum configured to rotate about a second drum axis extending in the first direction, a second developing device configured to supply toner to the second photosensitive drum, and a second supplying device configured to supply the toner to the second developing device. The second supplying device is formed with a second supply port through which the toner to be supplied to the second developing device is provided, and the second supplying port is opened to outside the housing.

According to aspects of the present disclosures, there is also provided a process cartridge, that includes a first side plate, a second side plate located away, in a first direction, with respect to the first side plate, a photosensitive drum configured to rotate about a drum axis extending in the first direction, a developing device configured to supply toner to the photosensitive drum, a supplying device configured to supply the toner to the developing device. The supplying device includes a container having a supply port to receive the toner to be supplied to the developing device, and a toner tube enabling passage of the toner from the container to the developing device. The process cartridge further includes a cleaner configured to clean a surface of the photoconductive drum, and a waste toner tube enabling passage of waste toner from the cleaner to the waste toner container. The photosensitive drum, the developing device and the cleaner are located between, in the first direction, the first side plate and the second side plate. The container of the supplying device and the waste toner container is located on an opposite side of the second side plate with respect to the first side plate.

According to aspects of the present disclosures, there is provided an image forming device, which includes a housing formed with an opening, a cover configured to move between a closing position at which the cover closes the opening and an opening position at which the cover exposes the opening, and a plurality of process cartridges including a first process cartridge and a second process cartridge. The first process cartridge includes a first photosensitive drum configured to rotate about a first drum axis extending in a first direction, a first developing device configured to supply toner to the first photosensitive drum, and a first supplying device which has a first mechanism enabling communication between the first supplying device and the first developing device, a first supply port through which the toner to be supplied to the first developing device is received. The first supplying port is opened to outside the housing, and the toner received through the first supply port is supplied to the first developing device by the first mechanism. The second process cartridge includes a second photosensitive drum configured to rotate about a second drum axis extending in a first direction, a second developing device configured to supply toner to the second photosensitive drum, and a second supplying device, which has a second mechanism enabling communication between the second supplying device and the second developing device, a second supply port through which the toner to be supplied to the second developing device is received, the second supplying port being opened to outside the housing. The toner received through the second supply port is supplied to the second developing device by the second mechanism.

1. OVERALL CONFIGURATION OF IMAGE FORMING DEVICE 1

Hereinafter, an overall configuration of an image forming device 1 according to a present embodiment will be described with reference to FIGS. 1-3.

Figure 1:
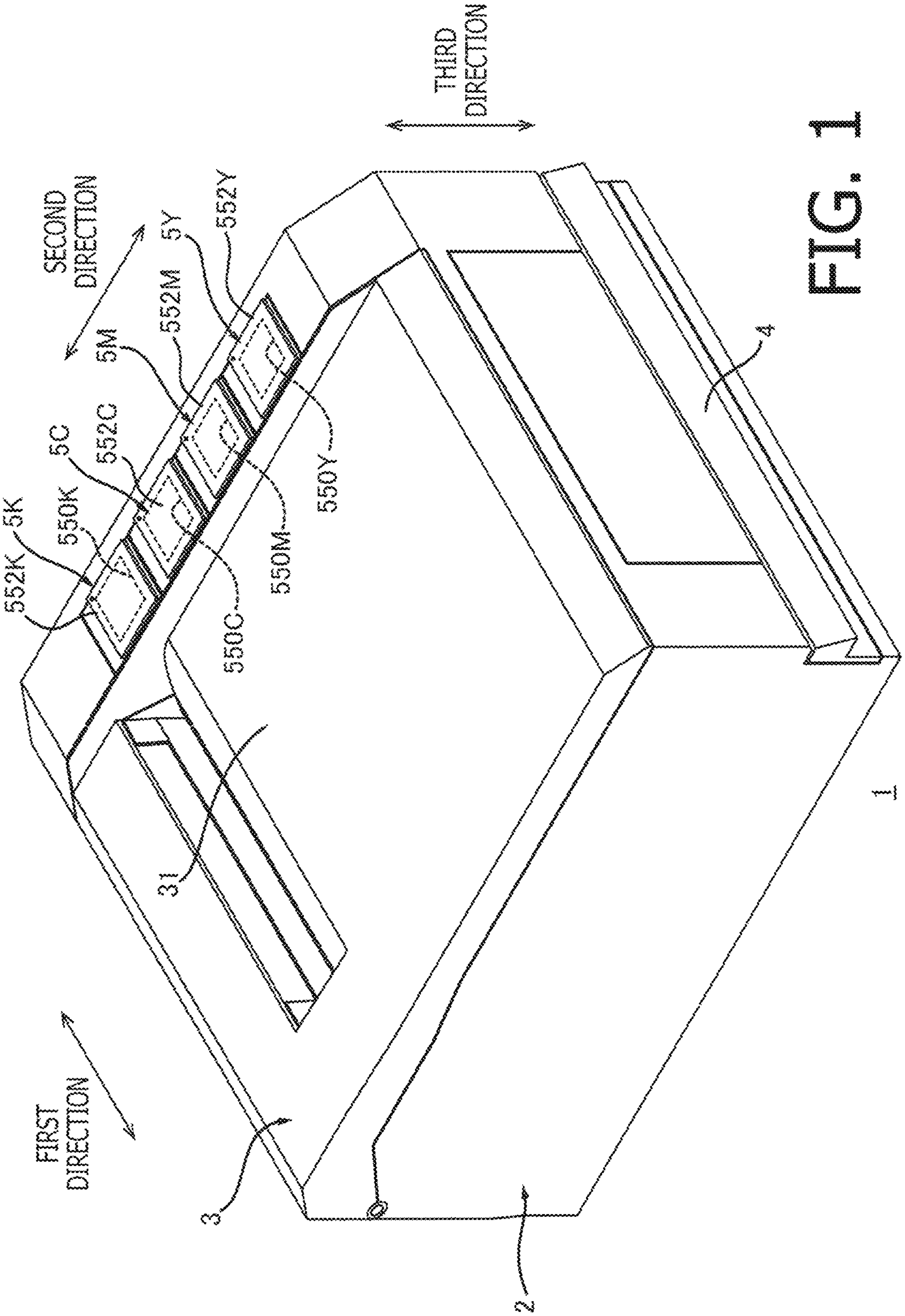
FIG. 1 is a perspective view of an image forming device according to the present disclosures.
Figure 2:
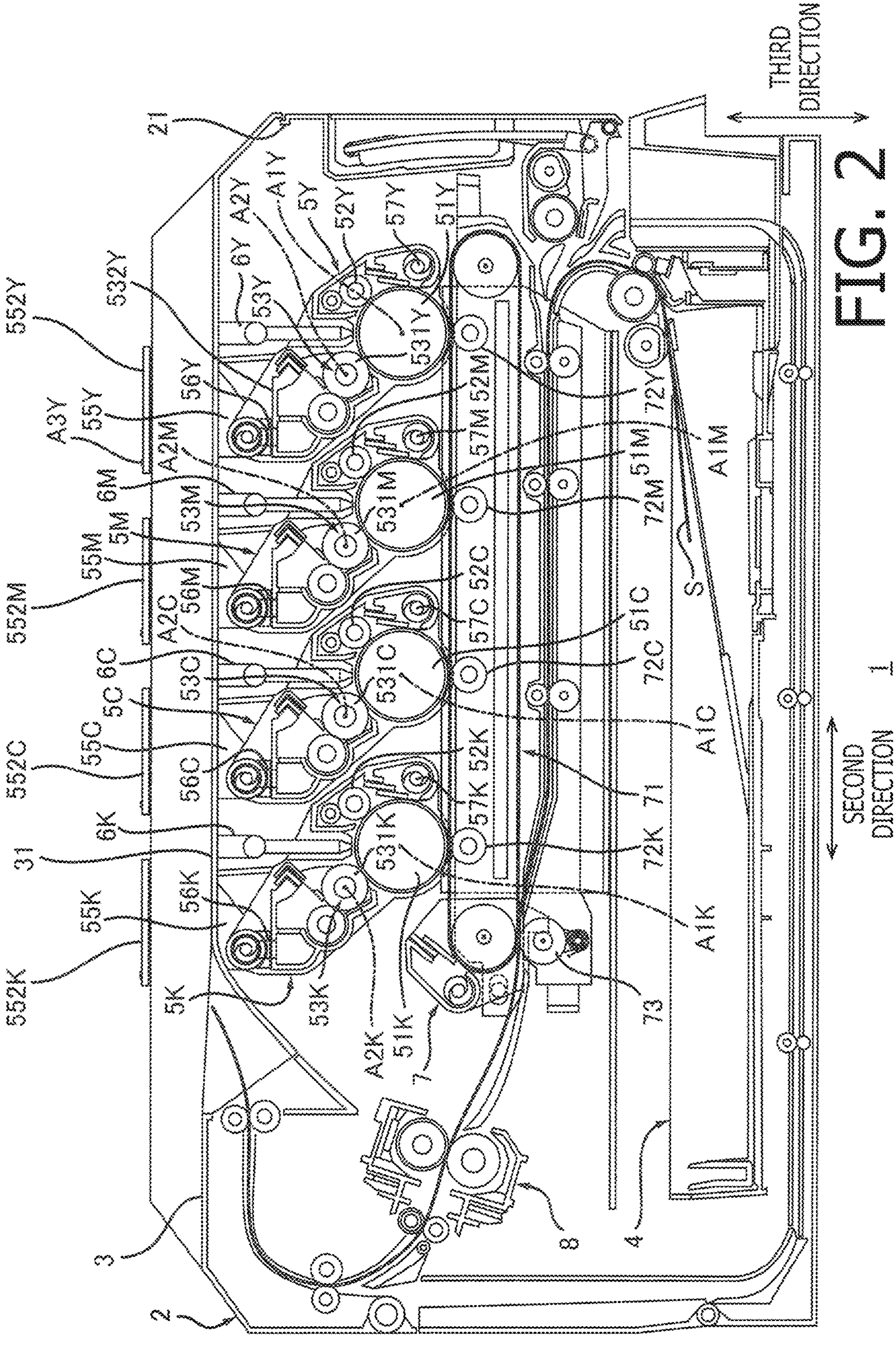
FIG. 2 is a cross-sectional side view showing a schematic configuration of the image forming device.

As shown in FIGS. 1 and 2, the image forming device 1 is provided with a housing 2, a cover 3, a sheet container 4, multiple process cartridges 5Y, 5M, 5C and 5K, multiple exposure heads 6Y, 6M, 6C and 6K, a transfer device 7, and a fixing device 8. For a purpose of indicating directions in relation to the image forming device 1, a first direction, a second direction and a third direction, which are orthogonal to each other, are indicated in the drawings. In the description throughout the specification, upper cases Y, M, C and K (e.g., those in the process cartridges 5Y, 5M, 5C and 5K, and exposure heads 6Y, 6M, 6C and 6K) indicate the members are related to colors of yellow, magenta, cyan and black, respectively.

1.1 Housing 2

The housing 2 is configured to accommodate the sheet container 4, the multiple process cartridges 5Y, 5M, 5C and 5K, the multiple exposure heads 6Y, 6M, 6C and 6K, the transfer device 7, and the fixing device 8.

As shown in FIG. 2, the housing 2 has an opening 21. The opening 21 is formed at an upper end portion of the housing 2 and opened toward upward.

1.2 Cover 3

Figure 3:
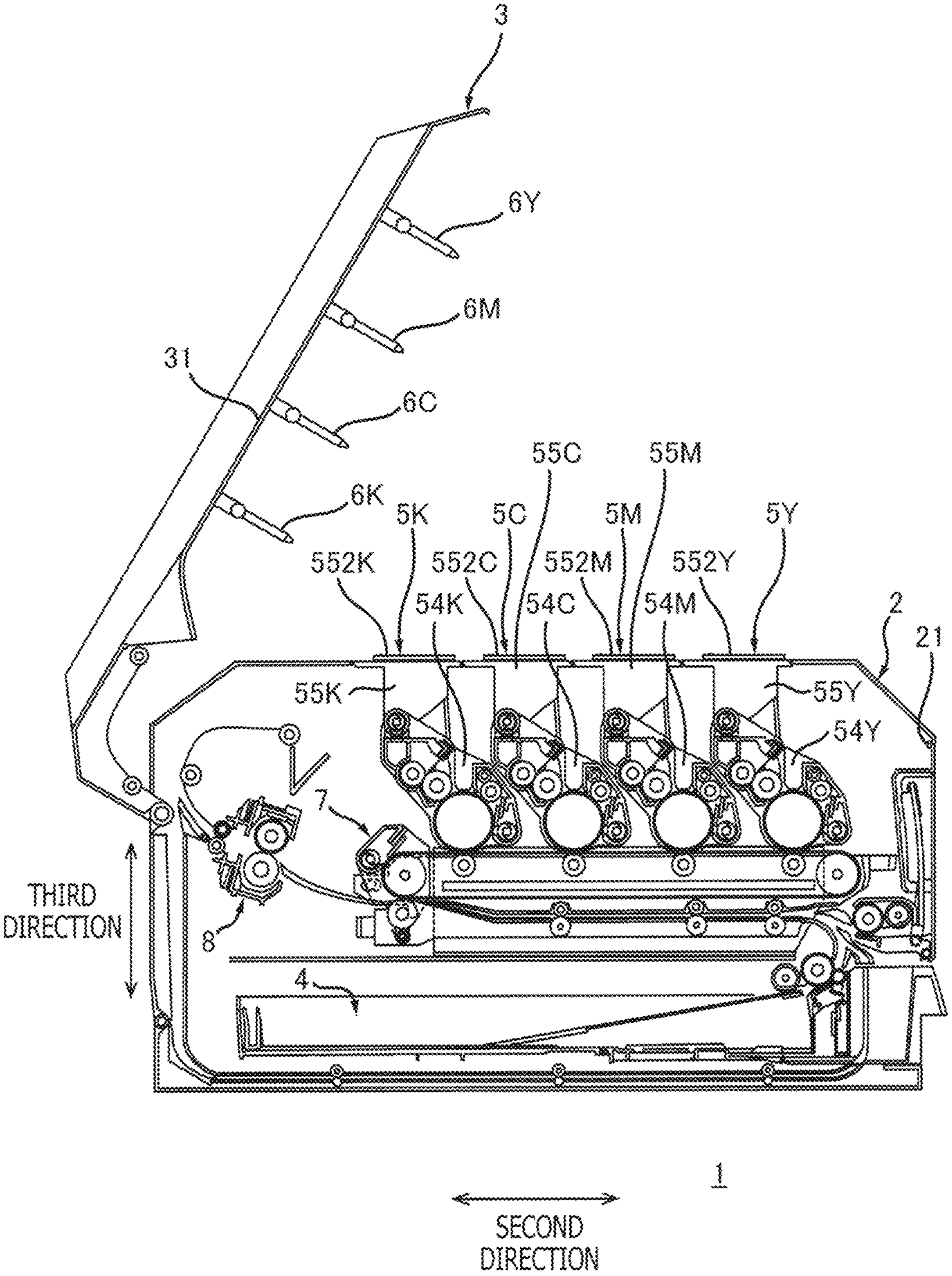
FIG. 3 is a cross-sectional side view of the image forming device when a cover is located at an opened position.

The cover 3 is configured to move between a closing position (see FIG. 2) and an opening position (see FIG. 3). When the cover 3 is located at the closing position, the cover 3 closes the opening 21, while when the cover 3 is located at the opening position, the opening 21 is uncovered. The cover 3 is formed with an ejection tray 31.

1.3 Sheet Container 4

The sheet container 4 is configured to contain multiple sheets S. The sheets S in the sheet container 4 are conveyed, one by one, toward the transfer device 7 (see FIG. 2).

1.4 Process Cartridges 5Y, 5M, 5C and 5K

As shown in FIG. 3, the process cartridges 5Y, 5M, 5C and 5K are detachably attached. That is, each of the process cartridges 5Y, 5M, 5C and 5K is configured to be exchanged through the opening 21 of the housing 2 in a state where the cover 3 is located at the opening position.

As shown in FIG. 2, the process cartridge 5Y has a photosensitive drum 51Y, a charging device 52Y, and a developing device 53Y. The process cartridge 5M has a photosensitive drum 51M, a charging device 52M, and a developing device 53M. The process cartridge 5C has a photosensitive drum 51C, a charging device 52C, and a developing device 53C. The process cartridge 5K has a photosensitive drum 51K, a charging device 52K, and a developing device 53K. In a state where the process cartridges 5Y, 5M, 5C and 5K are attached to the image forming device 1, the photosensitive drums 51Y, 51M, 51C and 51K are aligned in the second direction as indicated in FIG. 2.

The process cartridges 5Y, 5M, 5C and 5K have the same configurations. Therefore, in the following description, only the configuration of the process cartridge 5Y will be described, and the description of the configurations of the other process cartridges 5M, 5C and 5K will be omitted.

Figure 5:
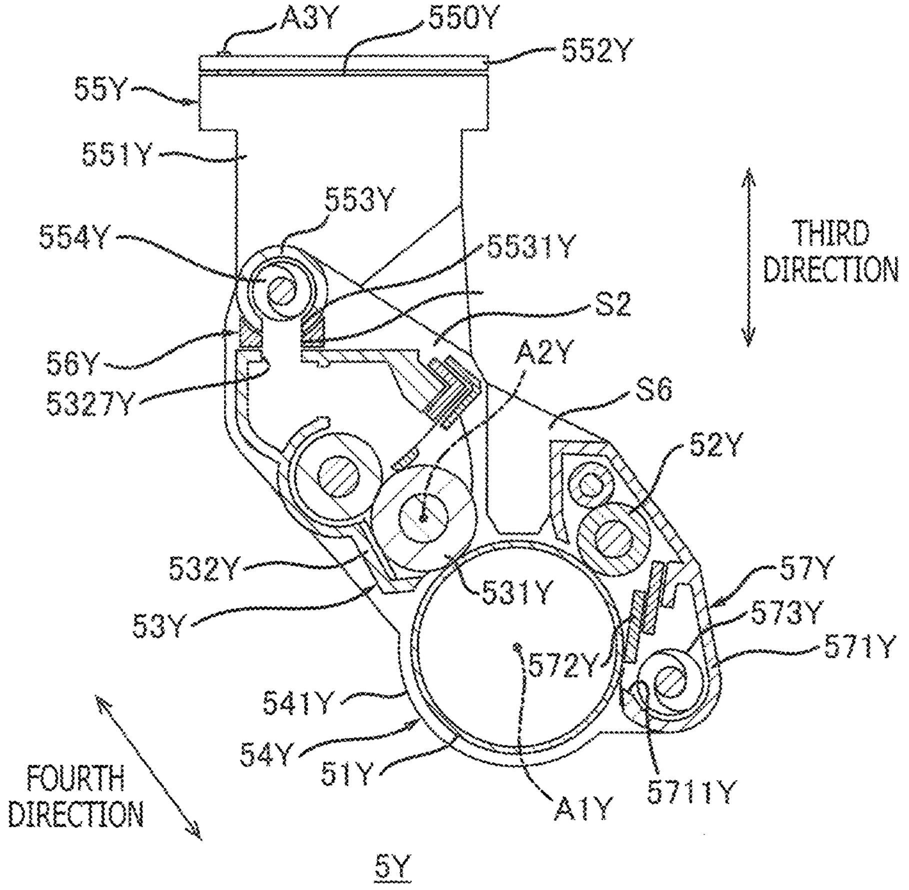
FIG. 5 is a cross-sectional view of the process cartridge taken along line A-A in FIG. 4.

The photosensitive drum 51Y is configured to rotate about a drum axis A1Y (see FIG. 5). The drum axis A1Y extends in the first direction. The photosensitive drum 51Y has an elongated cylinder shape extending in the first direction.

The charging device 52Y is configured to charge a circumferential surface of the photosensitive drum 51Y. According to the present embodiment, the charging device 52Y is a charging roller. It is noted that the charging device 52Y may be a scorotron-type charger.

The developing device 53Y is configured to supply the toner to the photosensitive drum 51Y. Since the photosensitive drum 51Y is for forming a yellow image, yellow toner is supplied to the photosensitive drum 51Y. The developing device 53Y has a developing roller 531Y and a developer housing 532Y. The developing roller 531Y is configured to supply the toner inside the developer housing 532Y to the photosensitive drum 51Y. The developing roller 531Y is configured to contact the photosensitive drum 51Y. The developing roller 531 is an elongated cylindrical shape extending in the first direction. The developing roller 531Y is configured to rotate about a developer axis A2Y. The developer axis A2Y extends in the first direction. The developer housing 532Y is configured to accommodate the toner.

1.5 Exposure Heads 6Y, 6M, 6C and 6K

Figure 4:
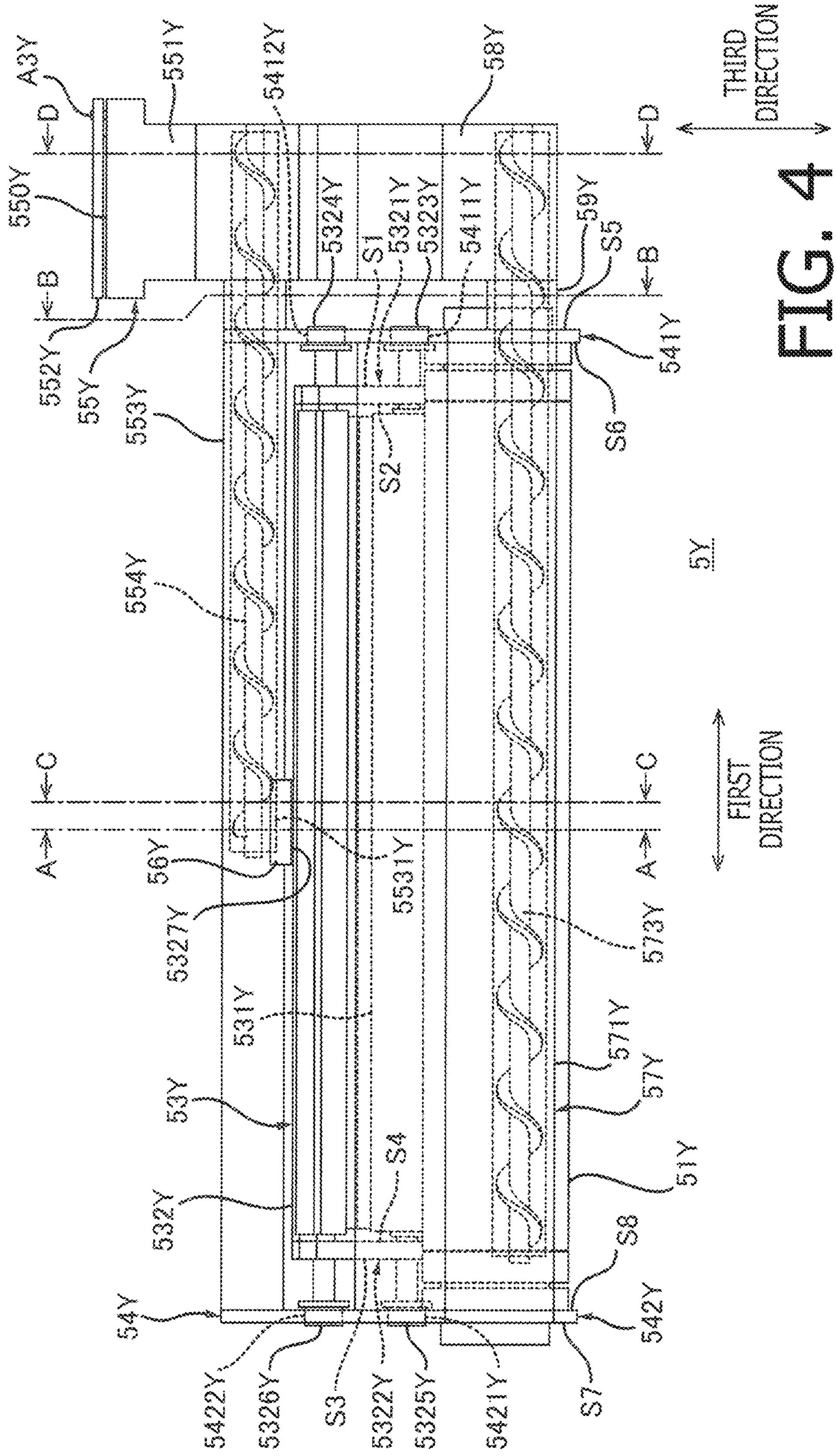
FIG. 4 is a front view of a process cartridge.

The exposure heads 6Y, 6M, 6C and 6K are disposed to the cover 3 (see FIGS. 3 and 4). The exposure head 6Y is configured to expose a circumferential surface of the photosensitive drum 51Y. The exposure head 6M is configured to expose a circumferential surface of the photosensitive drum 51M. The exposure head 6C is configured to expose a circumferential surface of the photosensitive drum 51C. The exposure head 6K is configured to expose a circumferential surface of the photosensitive drum 51K.

1.6 Transfer Device 7

In a state where the process cartridges 5Y, 5M, 5C and 5K are attached to the image forming device 1, the transfer device 7 is arranged below the photosensitive drums 51Y, 51M, 51C and 51K (see FIG. 2). The transfer device 7 has an intermediate transfer belt 71, multiple primary transfer rollers 72Y, 72M, 72C and 72K, and a secondary transfer roller 73 as shown in FIG. 2.

In a state where the process cartridges 5Y, 5M, 5C and 5K are attached to the image forming device 1, the intermediate transfer belt 71 is configured to contact the photosensitive drums 51Y, 51M, 51C and 51K.

The primary transfer roller 72Y is configured to transfer the toner from the photosensitive drum 51Y to the intermediate transfer belt 71. The primary transfer roller 72M is configured to transfer the toner from the photosensitive drum 51M to the intermediate transfer belt 71. The primary transfer roller 72C is configured to transfer the toner from the photosensitive drum 51C to the intermediate transfer belt 71. The primary transfer roller 72K is configured to transfer the toner from the photosensitive drum 51K to the intermediate transfer belt 71. The secondary transfer roller 73 is configured to transfer the toner from the intermediate transfer belt 71 to the sheet S.

1.7 Fixing Device 8

The fixing device 8 is configured to apply heat and pressure to the sheet S on which the toner (i.e., a toner image) has been transferred to fix the toner onto the sheet S. The sheet S passed through the fixing device 8 is ejected onto the ejection tray 31.

2. Details of Process Cartridges 5Y, 5M, 5C and 5K

Details of the process cartridges 5Y, 5M, 5C and 5K will be described.

As shown in FIGS. 4 and 5, the process cartridge 5Y further includes a frame 54Y, a supplying device 55Y, a sealing member 56Y, a cleaner 57Y, a waste toner container 58Y, a waste toner tube 59Y, in addition to the photosensitive drum 51Y, the charging device 52Y, and the developing device 53Y.

2.1 Process Cartridge 5Y 2.1.1 Developer Casing 532Y

As shown in FIG. 4, developer housing (developer housing) 532Y has a side plate 5321Y, a side plate 5322Y, a projection 5323Y, a projection 5324Y, a projection 5325Y, a projection 5326Y, and a receiving port 5327Y. The developer housing 532Y extends in the first direction.

2.1.1.1 Side Plate 5321Y and Side Plate 5322Y

The side plate 5321Y is located at one end portion, in the first direction, of the developer housing 532Y. The side plate 5321Y extends in the second direction and a third direction, which is a direction orthogonal to both the first and second directions.

The side plate 5321Y is configured to support one end, in the first direction, of the developing roller 531Y. The side plate 5321Y has an outer surface S1 and an inner surface S2. The inner surface S2 is located between, in the first direction, the outer surface S1 and the side plate 5322Y.

The side plate 5322Y is located at the other end of the developer housing 532Y in the first direction. The side plate 5322Y is located away from the side plate 5321Y in the first direction. The side plate 5322Y extends in the second and third directions. The side plate 5322Y is configured to support the other end of the developing roller 531Y in the first direction. The side plate 5322Y has an outer surface S3 and an inner surface S4. The inner surface S4 is located between, in the first direction, the outer surface S3 and the side plate 5321Y.

2.1.1.2 Projection 5323Y, Projection 5324Y, Projection 5235Y, and Projection 5326Y The projection 5323Y is provided on the outer surface S1 of the side plate 5321Y. The projection 5323Y extends in the first direction. The projection 5323Y has a cylindrical shape. The projection 5323Y may be attached to the outer surface S1. In the present embodiment, the projection 5323Y may be one end of the developing roller 531Y in the first direction.

The projection 5324Y is provided on the outer surface S1 of the side plate 5321Y. The projection 5324Y extends in the first direction. The projection 5324Y has a cylindrical shape. The projection 5324Y may be attached to the outer surface S1.

The projection 5325Y is provided on the outer surface S3 of the side plate 5322Y. The projection 5325Y extends in the first direction. The projection 5235Y has a cylindrical shape. It is noted that the projection 5325Y may be attached to the outer surface S3 of the side plate 5322Y. According to the present embodiment, the projection 5325Y may be the other end portion of the developing roller 531Y in the first direction.

The projection 5326Y is provided on the outer surface S3 of the side plate 5322Y. The projection 5326Y extends in the first direction. The projection 5326Y has a cylindrical shape. It is noted that the projection 5326Y may be provided to the outer surface S3.

2.1.1.3 Receiving Port 5327Y

The receiving port 5327Y is configured to receive the toner from the supplying device 55Y. According to the present embodiment, the receiving port 5327Y is located at a central portion, in the first direction, of the developer housing 532Y.

2.1.2 Frame 54Y

As shown in FIGS. 4 and 5, the frame 54Y has a side plate 541Y, and a side plate 542Y. In other words, the process cartridge 5Y has the side plate 541Y, and the side plate 542Y. The frame 54Y has the photosensitive drum 51Y, the charging device 52Y, the developing device 53Y, the supplying device 55Y, a cleaner 57Y, a waste toner container 58Y, and a waste toner tube 59Y.

2.1.2.1 Side Plate 541Y

The side plate 541Y is located at one end portion of the frame 54Y in the first direction. The side plate 541Y extends in the second and third directions. The side plate 541Y has an outer surface S5 and an inner surface S6. The inner surface S6 is located between, in the first direction, the outer surface S5 and the side plate 542Y. The side plate 541Y has a plurality of through-holes 5411Y and 5412Y.

Figure 6A:
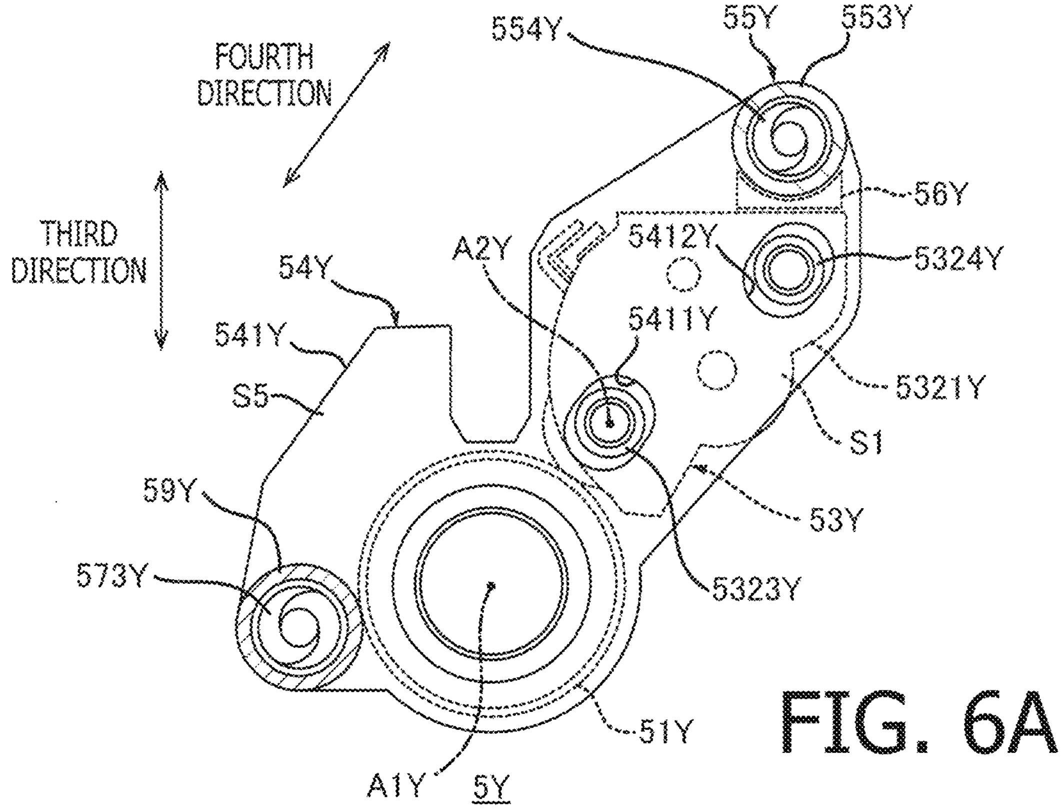
FIG. 6A is a cross-sectional view of the process cartridge taken along line B-B in FIG. 4.

As shown in FIG. 6A, the through-hole 5411Y is located between the photosensitive drum 51Y and the through-hole 5412Y in a fourth direction. The fourth direction is a direction connecting the drum axis A1Y and the developer axis A2Y on a plane orthogonal to the drum axis A1Y or the developer axis A2Y. The through-hole 5411Y is an elongated hole. The through-hole 5411Y extends in the fourth direction. As shown in FIG. 4, the projection 5323Y of the developer housing 532Y is configured to fit in the through-hole 5411Y.

The through-hole 5412Y is located away from the through-hole 5411Y in the fourth direction. The through-hole 5412Y is an elongated hole. The through-hole 5412Y extends in the fourth direction. The projection 5324Y of the developer housing 532Y is configured to fit in the through-hole 5412Y.

2.1.2.2 Side Plate 542Y

As shown in FIG. 4, the side plate 542Y is located at the other end of the frame 54Y in the first direction. The side plate 542Y is located away from the side plate 541Y in the first direction. The developing device 53Y is located between, in the first direction, the side plates 541Y and 542Y. The side plate 542Y extends in the second and third directions. The side plate 542Y has an outer surface S7 and an inner surface S8. The inner surface S8 is located between, in the first direction, the outer surface S7 and the side plate 541Y. The side plate 542Y has a plurality of through-holes 5421Y and 5422Y.

The through-hole 5421Y is located between, in the fourth direction, the photosensitive drum 51Y and the through-hole 5422Y. The through-hole 5421Y is an elongated hole extending in the fourth direction. The projection 5325Y of the developer housing 532Y is configured to fit into the through-hole 5421Y.

The through-hole 5422Y is located away from the through-hole 5421Y in the fourth direction. The through-hole 5422Y is an elongated hole extending in the fourth direction. As shown in FIG. 4, the projections 5326Y of the developer housing 532Y are configured to fit into the through-holes 5422Y.

The projection 5323Y fits into the through-hole 5411Y, the projection 5324Y fits into the through-hole 5412Y, the projection 5325Y fits into the through-hole 5421Y, and the projection 5326Y fits into the through-hole 5422Y, thereby allowing the developing device 53Y to move, with respect to the photosensitive drum 51Y, in the fourth direction.

2.1.3 Supplying Device 55Y

The supplying device 55Y is configured to supply the toner to the developing device 53Y. As shown in FIG. 4, the supplying device 55Y has a container 551Y, a supplying cover 552Y, a toner tube 553Y and a screw 554Y.

2.1.3.1 Container 551Y, Supplying Port 550Y, Supplying Cover 552Y As shown in FIG. 4, the container 551Y is located at one end of the process cartridge 5Y in the first direction. In a state where the process cartridge 5Y is attached to the image forming device 1, the container 551Y is located on an opposite side of the side plate 542Y with respect to the side plate 541Y of the frame 54Y in the first direction. In a state where the process cartridge 5Y is installed in the image forming device 1, the container 551Y is positioned above the waste toner container 58Y. The container 551Y has a square cylindrical shape, which extends in the third direction.

The container 551Y has a supply port 550Y. In other words, the supplying device 55Y has the supply port 550Y. The supply port 550Y is configured to receive the toner to be supplied to the developing device 53Y. In a state where the process cartridge 5Y is attached to the image forming device 1, the supply port 550Y is opened to the outside of the housing 2. The supply port 550Y is formed on an upper end of the container 551Y.

Figure 7:
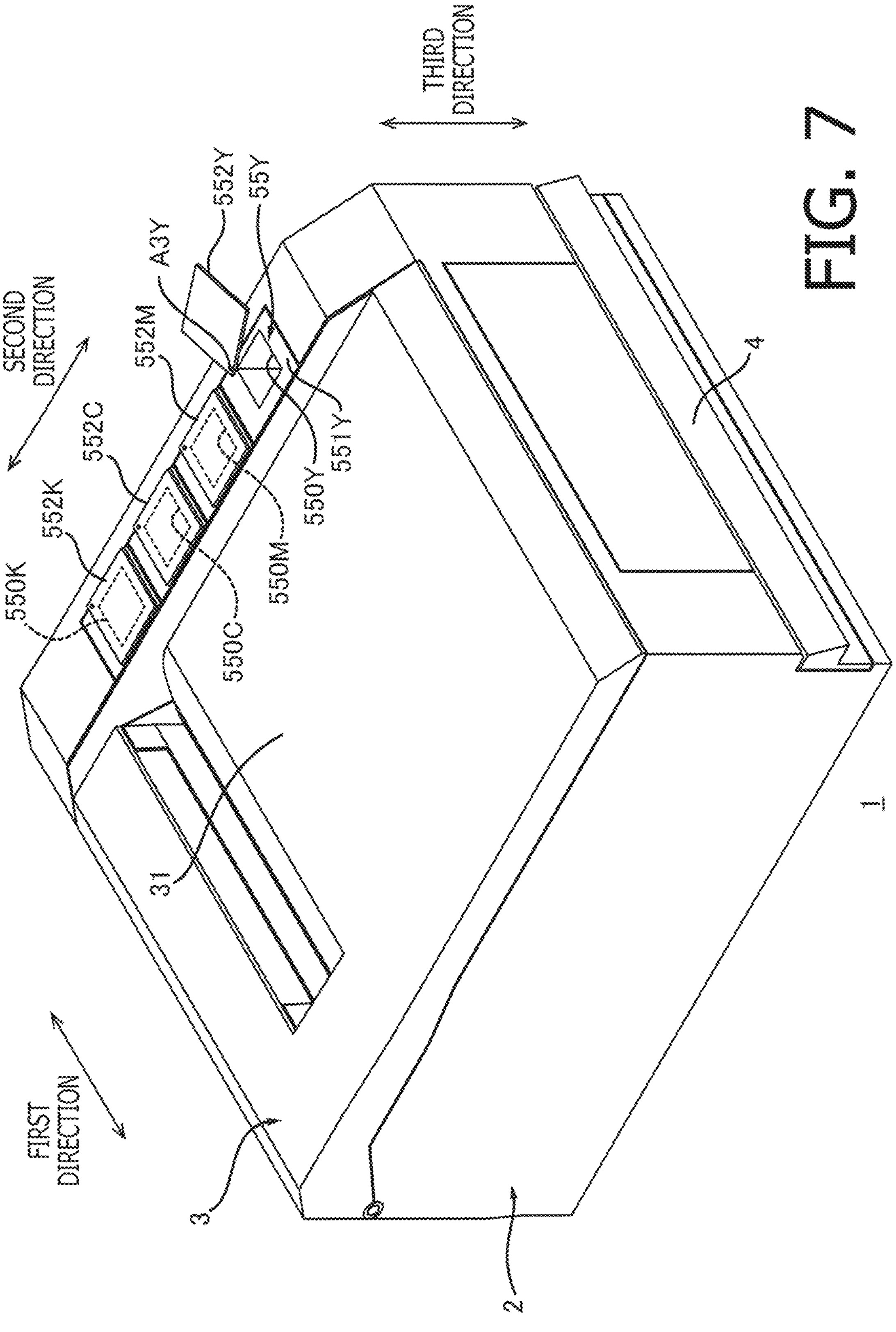
FIG. 7 is a perspective view of the image forming device when a supply port is in an opened state.

As shown in FIG. 7, the supplying cover 552Y is configured to open and close the supply port 550Y. The supplying cover 552Y extends in the first and second directions. The supplying cover 552Y is rotatable about the axis A3Y, which extends in the third direction.

Figure 9:
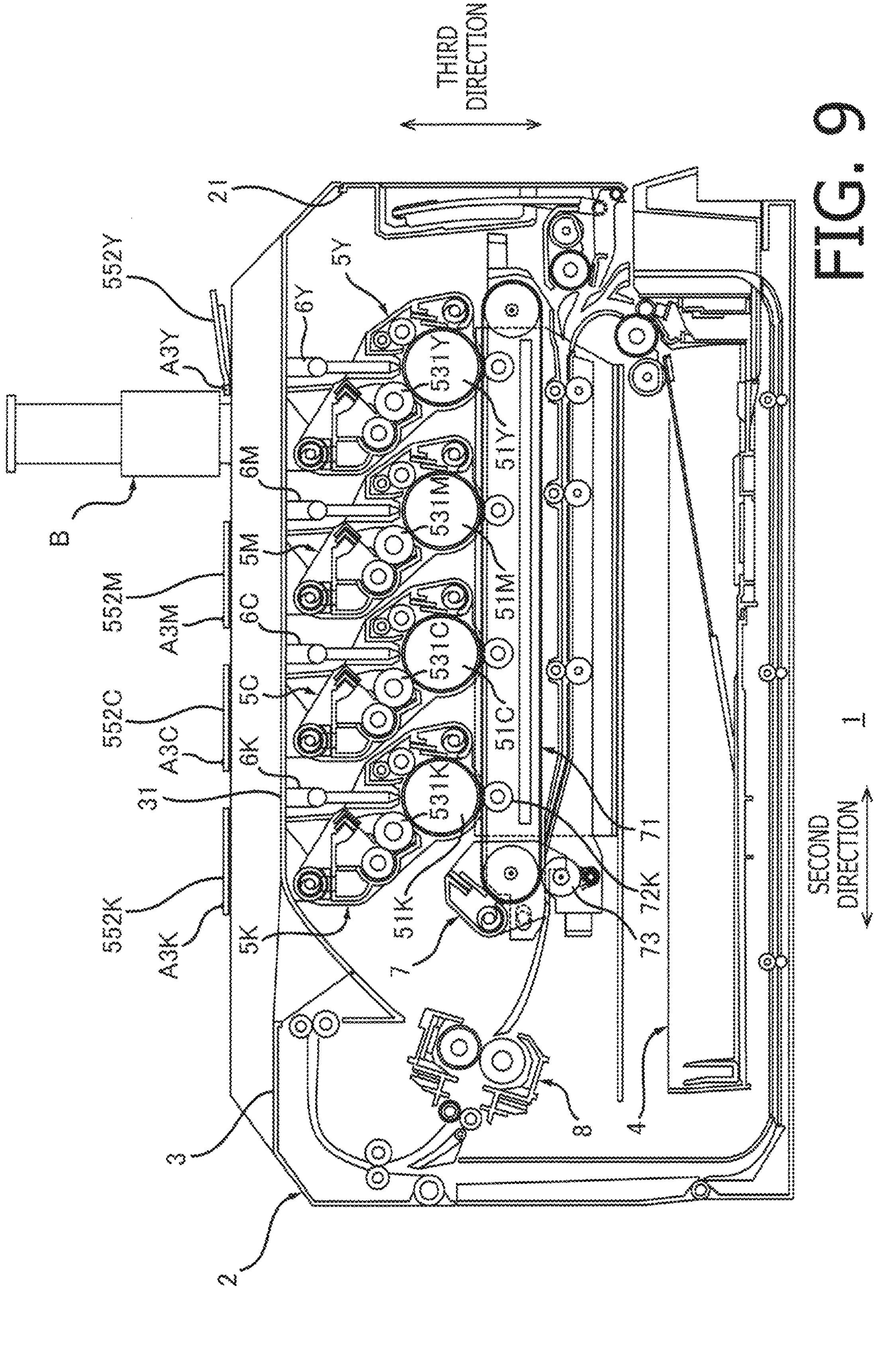
FIG. 9 is a cross-sectional view of the image forming process when a supply container is received by the supply port.

In a state where the supply port 550Y is opened, a part of a toner bottle B can be inserted in the supply port 550Y as shown in FIG. 9. According to the embodiment shown in FIG. 9, the part of the toner bottle B is a lower end portion of the toner bottle B. The toner bottle B is configured to accommodate the toner to be replenished. The toner bottle B is removed after the toner has been replenished.

2.1.3.2 Toner Tube 553Y

Figure 6B:
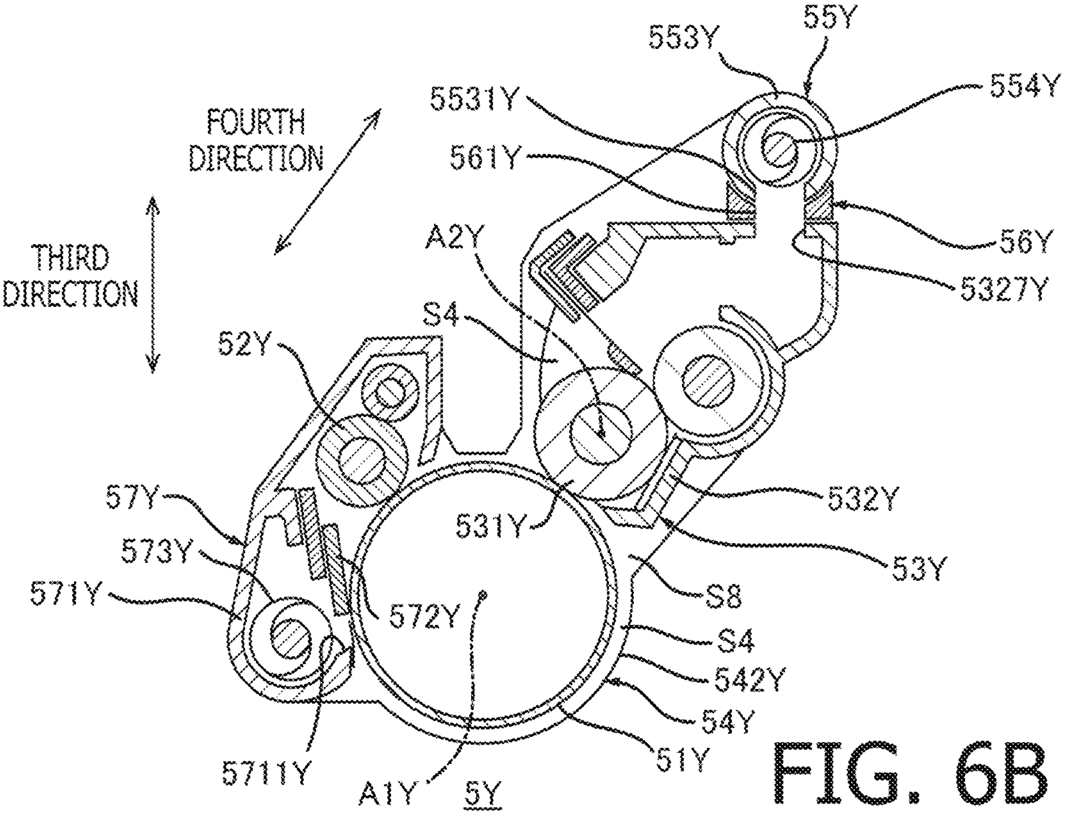
FIG. 6B is a cross-sectional view of the process cartridge taken along line C-C in FIG. 4.

As shown in FIG. 4, the toner tube 553Y enables the passage of the toner from the container 551Y to the developing device 53Y. The toner tube 553Y extends in the first direction. The toner tube 553Y penetrates through the side plate 541Y. One end of the toner tube 553Y, in the first direction, communicates with the container 551Y. As shown in FIG. 6B, the toner tube 553Y has an outlet 5531Y. As shown in FIG. 4, the outlet 5531Y is located at the other end, in the first direction, of the toner tube 553Y. The outlet 5531Y is located between the side plates 5321Y and 5322Y of the developer housing 532Y in the first direction. Although the outlet 5531Y is located substantially at a central portion in the first direction in an example shown in FIG. 4, the outlet 5531Y could be located at any position between the side plates 5321Y and 5322Y.

2.1.3.3 Screw 554Y

As shown in FIG. 4, the screw 554Y is disposed inside the toner tube 553Y. The screw 554Y is configured to be rotated to convey the toner inside the toner tube 553Y toward the outlet 5531Y. The screw 554Y extends in the first direction. The screw 554Y is driven to rotate as needed by a not-shown driving source. It is noted that a part of the screw 554Y is located in the container 551Y. According to the present embodiment, the screw 554Y is an auger screw. It is noted that the screw 554Y may be a shaftless screw.

2.1.4 Sealing Member 56Y

As shown in FIGS. 4 and 6B, the sealing member 56Y seals between the supplying device 55Y and the developer housing 532Y. The sealing member 56Y is located between the toner tube 553Y and the developer housing 532Y. The sealing member 56Y has a through-hole 561Y. The sealing member 56Y extends in the third direction. An upper end of the sealing member 56Y is in contact with the toner tube 553Y. A lower end of the sealing member 56Y is in contact with the developer housing 532Y. The through-hole 561Y communicates with the outlet 5531Y. The through-hole 561Y also communicates with the receiving port 5327Y of the developer housing 532Y. In the present embodiment, the sealing member 56Y is made of an elastic material such as a sponge. The sealing member 56Y is elastically deformable in response to the movement of the developing device 53Y. The toner conveyed through the toner tube 533Y and ejected from the outlet 5531Y enters the receiving port 5327Y of the developer housing 532Y through through-hole 561Y of the sealing member 56Y. The sealing member 56Y prevents leakage of the toner between the outlet 5531Y and the receiving port 5327Y.

2.1.5 Cleaner 57Y

As shown in FIG. 4, the cleaner 57Y is located between, in the first direction, the side plate 541Y and the side plate 542Y. The cleaner 57Y is configured to clean the surface of the photosensitive drum 51Y. As shown in FIG. 5, the cleaner 57Y has a cleaner housing 571Y, a cleaning member 572Y, and a screw 573Y.

2.1.5.1 Cleaner Housing 571Y

The cleaner housing 571Y is configured to accommodate the waste toner removed from the photosensitive drum 51Y. The cleaner housing 571Y extends in the first direction. The cleaner housing 571Y has an opening 5711Y, which extends in the first direction.

2.1.5.2 Cleaning Member 572Y

The cleaning member 572Y is configured to clean a surface of the photosensitive drum 51Y. The cleaning member 572Y is attached to the cleaner housing 571Y. An edge of the cleaning member 572Y contacts the surface of the photosensitive drum 51Y. The waste toner removed from the surface of the photosensitive drum 51Y by the cleaning member 572Y enters the cleaner housing 571Y through the opening 5711Y.

2.1.5.3 Screw 573Y

As shown in FIG. 4, the screw 573Y is provided inside the cleaner housing 571Y. The screw 573Y conveys the waste toner inside the cleaner housing 571Y toward the waste toner container 58Y. The screw 573Y extends in the first direction. The screw 573Y is configured to rotate. In the present embodiment, the screw 573Y is an auger screw. It is noted that the screw 573Y may be a shaftless screw. In the present embodiment, the screw 573Y extends to inside of the waste toner tube 59Y. The screw 573Y is driven to rotate as needed by a not-shown driving source.

2.1.6 Waste Toner Container 58Y

Figure 8:
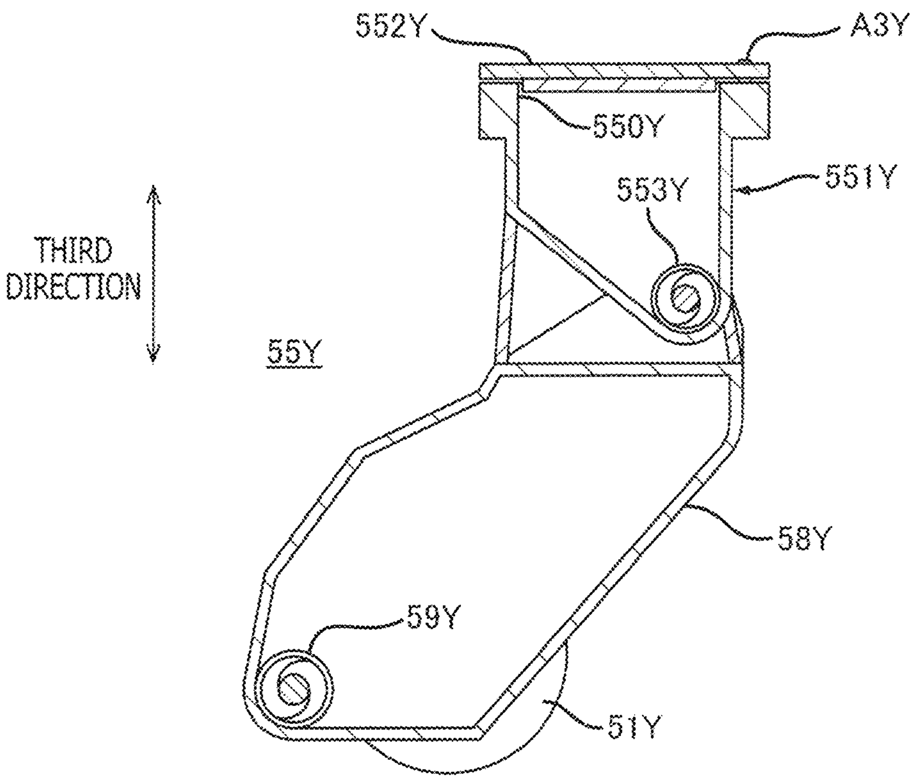
FIG. 8 is a cross-sectional view of the process cartridge taken along line D-D in FIG. 4.

The waste toner container 58Y is configured to accommodate the waste toner from the photosensitive drum 51Y. The waste toner container 58Y is located on the opposite side of the side plate 542Y with respect to the side plate 541Y in the first direction. The container 551Y and the waste toner container 58Y of the supplying device 55Y are aligned in a direction orthogonal to the first direction. In a state where the process cartridge 5Y is attached to the image forming device 1, the waste toner container 58Y is arranged below the container 551Y. In the present embodiment, the waste toner container 58Y and the container 551Y are integrally formed, as shown in FIG. 8.

2.1.7 Waste Toner Tube 59Y

As shown in FIG. 4, the waste toner tube 59Y allows the passage of the toner from the cleaner 57Y to the waste toner container 58Y. The waste toner tube 59Y extends in the first direction. The waste toner tube 59Y is located between, in the first direction, the side plate 541Y and the waste toner container 58Y. One end of the waste toner tube 59Y in the first direction communicates with the waste toner container 58Y. The other end of the waste toner tube 59Y in the first direction communicates with the cleaner housing 571Y. In the present embodiment, the waste toner tube 59Y has a cylindrical shape.

2.2 Process Cartridges 5M, 5C, 5K

The process cartridge 5M includes a frame 54M, a supplying device 55M, a sealing member 56M, a cleaner 57M, a waste toner container 58M, and a waste toner tube 59M in addition to the above-described photosensitive drum 51M, charging device 52M and the developing device 53M.

Each of the process cartridges 5M, 5C, and 5K is described in the same way as the process cartridge 5Y. Therefore, a description of each of the process cartridges 5M, 5C, and 5K is omitted.

3. Arrangement of Supplying Port

As shown in FIG. 1, in a state where the process cartridges 5Y, 5M, 5C and 5K are attached to the image forming device 1, the supply ports 550Y, 550M, 550C and 550K of the supplying devices 55Y, 55M, 55C and 55K are arranged in the second direction. The supply ports 550Y, 550M, 550C, and 550K are exposed from the housing 2.

As shown in FIG. 7, the supply ports 550Y, 550M, 550C, and 550K are configured to open upward. The supply ports 550Y, 550M, 550C, and 550K are located outside the cover 3 in the closed position.

As shown in FIG. 1, the supply ports 550Y, 550M, 550C, and 550K are located above the upper end of the ejection tray 31.

4. Effects (1) According to the image forming device 1, the toner can be supplied to the developing device 53Y from the outside of the housing 2 via the supply port 550Y. The toner can be supplied to the developing device 53M from outside the housing 2 via the supply port 550M. The toner can be supplied to the developing device 53C from outside the housing 2 via the supply port 550C. The toner can be supplied to the developing device 53K from outside the housing 2 via the supply port 550K.

(2) According to the image forming device 1, the toner can be supplied to the supply ports 550Y, 550M, 550C and 550K from the above.

(3) According to the image forming device 1, the toner can be supplied to the supply ports 550Y, 550M, 550C and 550K, with the cover 3 being located at the closed position.

(4) In the image forming device 1, the supply ports 550Y, 550M, 550C and 550K are arranged at a higher level than the upper end portion of the ejection tray 31.

According to the above configuration, it is possible to prevent the supply ports 550Y, 550M, 550C and 550K from being covered by the sheet S ejected onto the ejection tray 31. Therefore, even if the sheets S are accumulated on the ejection tray 31, the toner can be supplied smoothly to the supply ports 550Y, 550M, 550C and 550K.

(5) In the process cartridge 5Y of the image forming device 1, the developing device 53Y is movable with respect to the photosensitive drum 51Y. The sealing member 56Y is configured to be deformed in accordance with the movement of the developing device 53Y.

According to this configuration, even when the developing device 53Y moves with respect to the photosensitive drum 51Y, the elastic deformation of the sealing member 56Y prevents the toner from spilling from a gap between the supplying device 55Y and the developer housing 532Y. The same effect can be achieved with the process cartridges 5M, 5C and 5K.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

5. Modification

(1) First Modification

Figure 10:
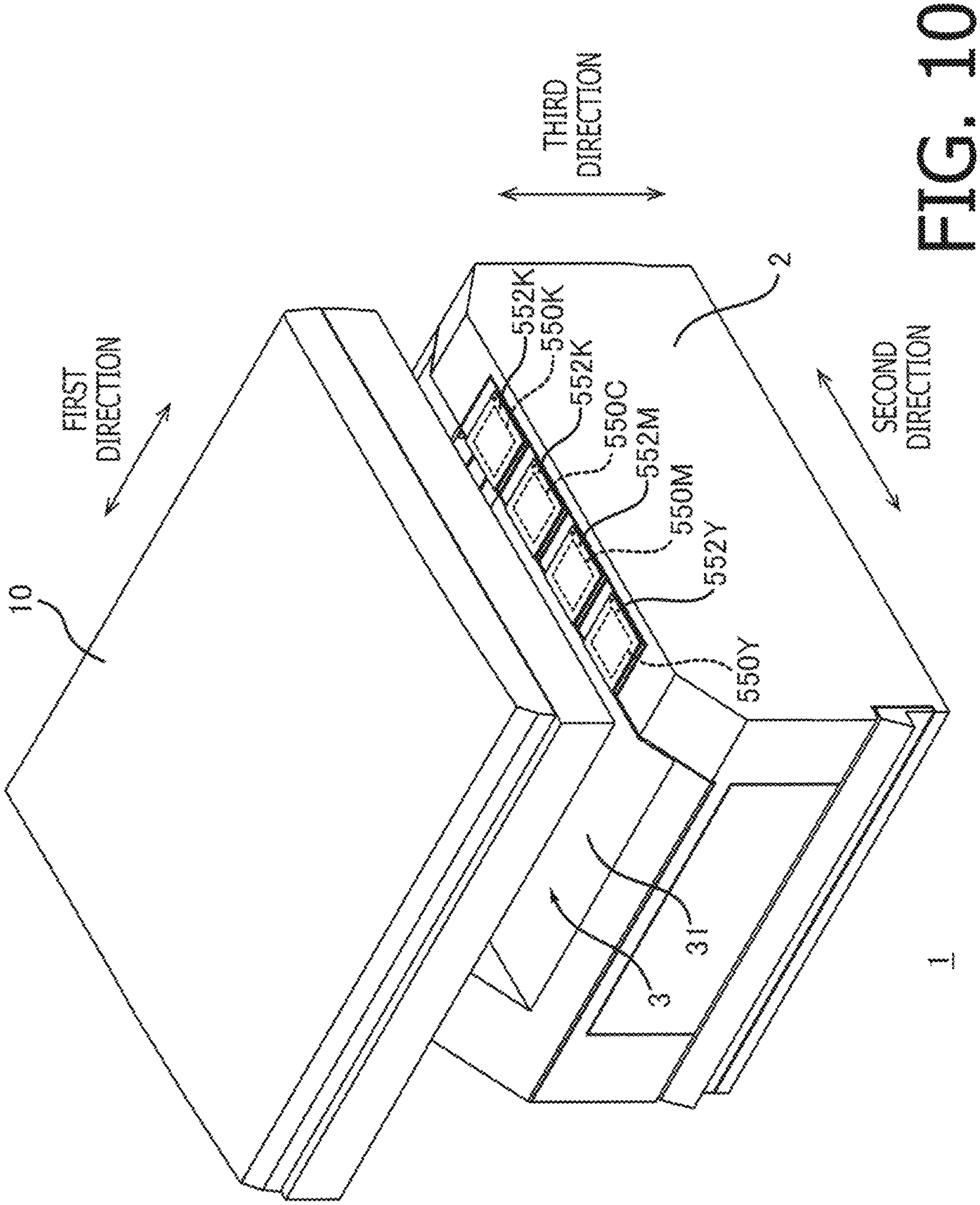
FIG. 10 is a perspective view of an image forming device according to a first modification.

As shown in FIG. 10, the image forming device 1 may be further provided with a reading device 10. The reading device 10 is a scanner.

The reading device 10 is located outside the housing 2. The reading device 10 is attached to the cover 3. The reading device 10 is located away from the supply ports 550Y, 550M, 550C and 550K in the first direction. That is, the supply ports 550Y, 550M, 550C, and 550K are located away from the reading device 10 in the first direction. In the present embodiment, the reading device 10 is located away from the supplying covers 552Y, 552M, 552C and 552K in the first direction.

Even in this type of image forming device 1, the toner can be supplied to the developing device 53Y from the outside of the housing 2 via the supply port 550Y. The toner can be supplied to the developing device 53M from the outside of the housing 2 via the supply port 550M. The toner can be supplied to the developing device 53C from the outside of the housing 2 via the supply port 550C. The toner can be supplied to the developing device 53K from the outside 2 of the housing via the supply port 550K.

(2) Second Modification

It is noted that the supply ports 550Y, 550M, 550C and 550K may be opened toward the first or second direction.

What is claimed is:

1. An image forming device, comprising:
a housing formed with an opening;
a cover configured to move between a closing position at which the cover closes the opening and an opening position at which the cover exposes the opening;
a first process cartridge comprising:
a first photosensitive drum configured to rotate about a drum axis extending in a first direction;
a first developing device configured to supply toner to the first photosensitive drum; and
a first supply port through which the toner to be supplied to the first developing device is provided; and
a second process cartridge comprising:
a second photosensitive drum configured to rotate about a drum axis extending in the first direction;
a second developing device configured to supply toner to the second photosensitive drum; and
a second supply port through which the toner to be supplied to the second developing device is provided,
wherein the first process cartridge and the second process cartridge are attachable to and detachable from the housing through the opening when the cover is in the opening position, and not attachable or detachable from the housing when the cover is in the closing position.

2. The image forming device according to claim 1, wherein the first supply port and the second supply port are exposed from the housing.

3. The image forming device according to claim 1, wherein the first supply port and the second supply port are opened upwardly.

4. The image forming device according to claim 1, wherein the first supply port and the second supply port are located on an outer side of the cover.

5. The image forming device according to claim 1, wherein the cover has an ejection tray onto which sheets are ejected.

6. The image forming device according to claim 5, wherein the first supply port and the second supply port are arranged at a higher level with respect to an upper end of the ejection tray.

7. The image forming device according to claim 1, further comprising a reading device configured to read an image of an original document,
wherein the first supply port and the second supply port are located away from the reading device in the first direction.

8. The image forming device according to claim 1, wherein the first process cartridge further comprises:
a first container having the first supply port; and
a first toner tube extending in the first direction and allowing passage of the toner from the first container to the first developing device, and
wherein the second process cartridge further comprises:
a second container having the second supply port; and
a second toner tube extending in the first direction and allowing passage of the toner from the second container to the second developing device.

9. The image forming device according to claim 1, further comprising:
a first exposing head configured to expose the first photosensitive drum to light; and
a second exposing head configured to expose the second photosensitive drum to light,
wherein the first exposing head and the second exposing head are attached to the cover.

10. The image forming device according to claim 9, wherein positions of the first supply port and the second supply port are higher than positions of the first exposing head and the second exposing head in a vertical direction.

* * * * *